H. E. HOUSE.
KALEIDOSCOPE.
APPLICATION FILED MAR. 24, 1919.
1,414,469. Patented May 2, 1922.
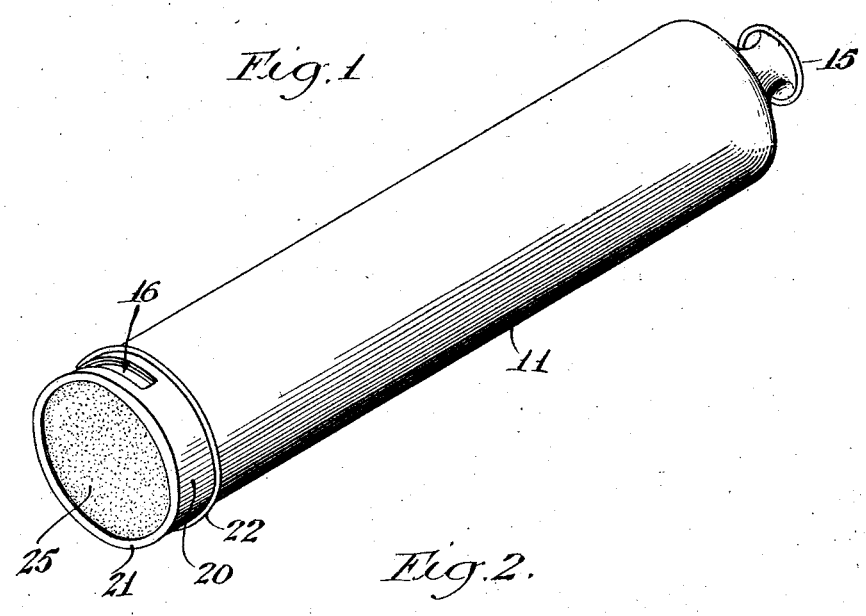
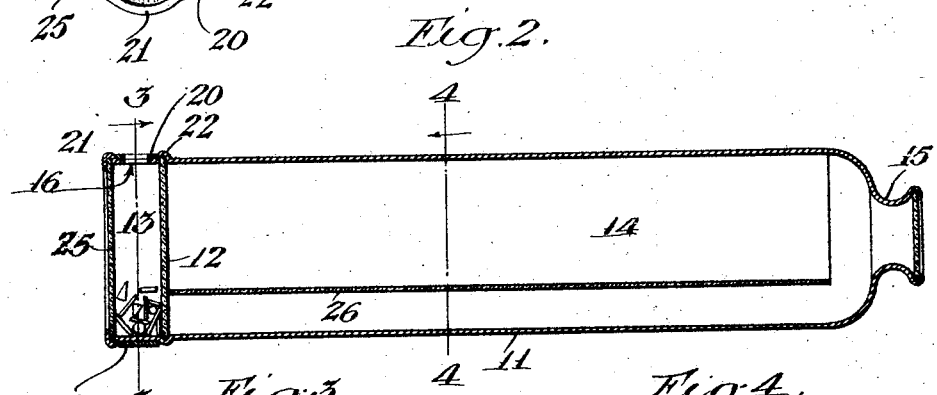
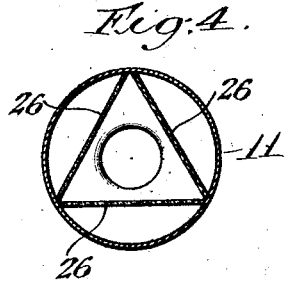
Inventor
Herbert E. House
by Graham + Lurie
Attorneys

UNITED STATES PATENT OFFICE.

HERBERT E. HOUSE, OF PASADENA, CALIFORNIA, ASSIGNOR TO CLARENCE S. POTTER AND WARREN T. POTTER, BOTH OF LOS ANGELES, CALIFORNIA, PARTNERS.

KALEIDOSCOPE.

1,414,469.  Specification of Letters Patent.  Patented May 2, 1922.

Application filed March 24, 1919. Serial No. 284,841.

*To all whom it may concern:*

Be it known that I, HERBERT E. HOUSE, a citizen of the United States, residing at Pasadena, in the county of Los Angeles and State of California, have invented a new and useful Improvement in Kaleidoscopes, of which the following is a specification.

The object of my invention is to provide a kaleidoscope in which the image forming members may be readily inserted and removed, so that perishable articles like bits of plants and flowers, butterflies' wings and other translucent or transparent objects may be utilized to form the images.

Referring to the drawings which are for illustrative purposes only:

Fig. 1 is a perspective view of my invention.

Fig. 2 is the central section through my invention.

Fig. 3 is a section through the image chamber on a plane represented by the line 3—3 of Fig. 2.

Fig. 4 is a section through the mirror chamber on a plane represented by line 4—4 in Fig. 2.

The kaleidoscope illustrated in these drawings consists of a tube 11, the interior of which is divided by a transparent partition 12 into an image chamber 13 and a mirror chamber 14. An eye piece 15 is provided through which the images formed may be viewed. The tube 11 is provided with an aperture 16 which is of sufficient size and so situated as to allow bits of colored glass 17, bits of vegetation 18, small pieces of flower petals 19, or the like, to be inserted and withdrawn from the image chamber. The aperture 16 is closed by a closure member 20 which is retained by rims 21 and 22 formed on the tube 11. The extreme outer edge of the image chamber 13 is closed by translucent glass member 25. Located in the mirror chamber 14 are three mirrors 26 in accordance with the standard practice in the art.

The method of operation of my invention is as follows:

The kaleidoscope being turned the image forming members 18 and 19 move in the image chamber 13 forming into different combinations which are reflected in the mirrors 26 to form geometric images in the usual manner.

By the use of my invention an added pleasure and novelty can be obtained from the kaleidoscope or it may be utilized to produce all sorts of fanciful designs for wall papers or textiles.

I claim as my invention:

In a kaleidoscope, a tube, a translucent member closing one end of said tube and forming one wall of an object chamber, a transparent partition forming another wall of said chamber, two annular ridges on the exterior of said tube on either side of an aperture opening into said object chamber, said ridges formed by forcing the material of the tube outwardly producing grooves on the inner surface of the tube to receive the peripheries of said translucent member and partition, and a ring fitting over said tube between said ridges, said ring having an opening registering with said aperture when said ring is turned to the proper position.

In testimony whereof, I have hereunto set my hand at Los Angeles, California, this 15th day of March, 1919.

HERBERT E. HOUSE.